United States Patent
Hung et al.

(10) Patent No.: US 8,623,775 B2
(45) Date of Patent: Jan. 7, 2014

(54) INFRARED ABSORBING FILTER AND LENS MODULE HAVING SAME

(75) Inventors: Hsin-Chin Hung, New Taipei (TW);
Chia-Ying Wu, New Taipei (TW);
Ming-Yang Liao, New Taipei (TW);
Juin-Hong Lin, New Taipei (TW);
Chao-Tsang Wei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/454,109

(22) Filed: Apr. 24, 2012

(65) Prior Publication Data
US 2013/0222894 A1  Aug. 29, 2013

(51) Int. Cl.
*C03C 3/17* (2006.01)
*G02B 13/14* (2006.01)

(52) U.S. Cl.
USPC .............................. 501/48; 359/356; 252/587

(58) Field of Classification Search
USPC .............................. 501/48; 252/587; 359/356
See application file for complete search history.

(56) References Cited

U.S. PATENT DOCUMENTS

| 7,618,909 B2 * | 11/2009 | Fujiwara et al. | 501/45 |
| 2005/0054511 A1 * | 3/2005 | Fujiwara et al. | 501/45 |
| 2013/0155495 A1 * | 6/2013 | Wang | 359/356 |

FOREIGN PATENT DOCUMENTS

JP  4-104918  * 4/1992

* cited by examiner

*Primary Examiner* — Karl Group
(74) *Attorney, Agent, or Firm* — Altis Law Group, Inc.

(57) ABSTRACT

An infrared absorbing filter includes a glass plate molded by melting a composition of raw materials and cooling the melted composition. The composition of raw materials includes 28-33 by percentage weight (wt %) of phosphorus pentoxide ($P_2O_5$), 14-33 wt % of A oxide ($A_2O$), 0.15-4 wt % of B oxide (BO), 2.5-8 wt % of copper oxide (CuO), 1.4-1.65 wt % of aluminum oxide ($Al_2O_3$). Wherein A is one of alkali metals, $A_2O$ is one of oxidizing alkali metals, B is one of alkaline earth metals, BO is one of oxidizing alkaline earth metals.

11 Claims, 2 Drawing Sheets

INFRARED ABSORBING FILTER AND LENS MODULE HAVING SAME

BACKGROUND

1. Technical Field

The present disclosure relates to lens modules and, particularly, to a lens module having an infrared absorbing filter for absorbing infrared light.

2. Description of Related Art

Lens modules may include at least one lens and a filter positioned at an image side of the lens. The filter may include a transparent substrate and an infrared filtering film coated on an object side of the transparent substrate. The filter is for reflecting infrared light rays while allowing the passage of visible light rays. However, about 5% or more of visible light rays are also reflected by the infrared filtering film. The reflected visible light rays form a glare in the image after multiple reflections in the lens module.

Therefore, it is desirable to provide a lens module, which can overcome the limitations described.

DETAILED DESCRIPTION

Embodiments of the disclosure will be described with reference to the drawings.

Figure 1:
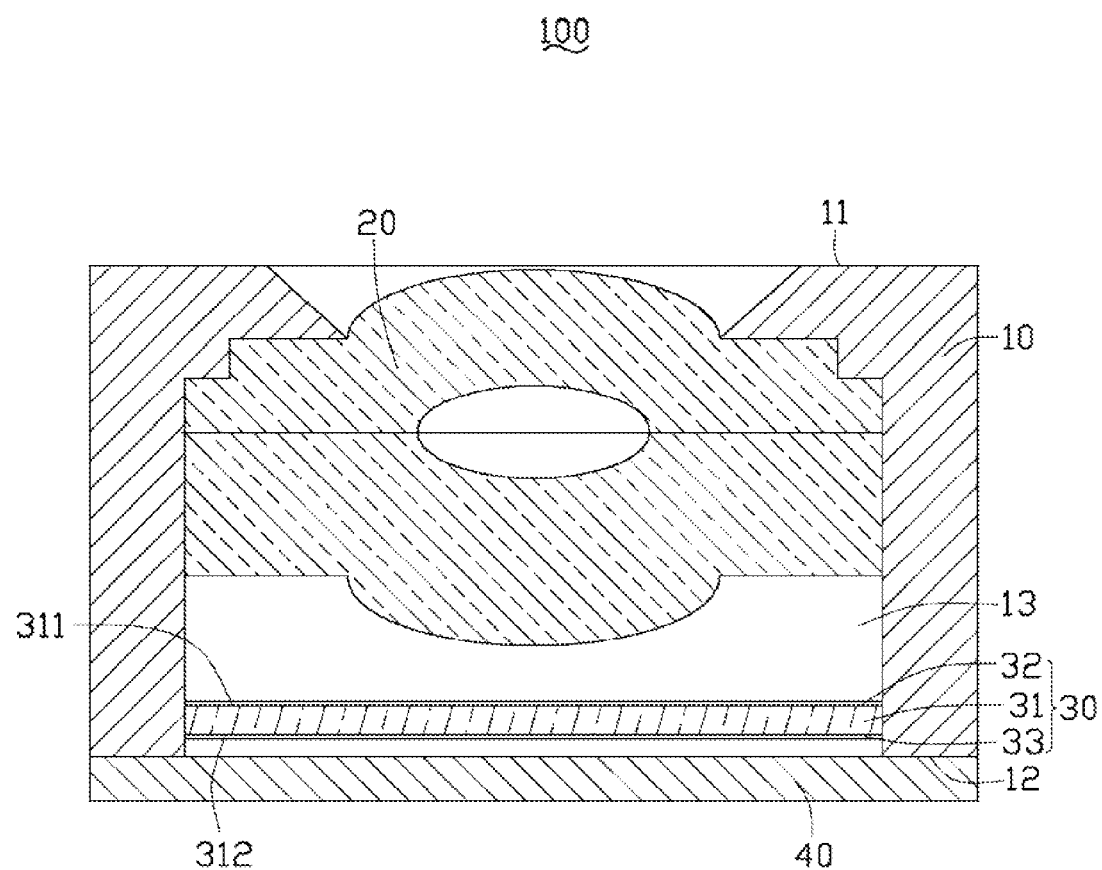
FIG. 1 is a cross-sectional schematic view of a lens module in accordance with an exemplary embodiment, the lens module including an infrared absorbing filter.

Referring to FIG. 1, a lens module 100, according to an exemplary embodiment, includes a lens barrel 10, at least one lens 20, an infrared absorbing filter 30, and an image sensor 40. Light coming into the lens barrel 10 passes the at least one lens 20 and the infrared absorbing filter 30, and form optical images on the image sensor 40.

The lens barrel 10 is tubular-shaped and includes an object-side end 11 and an image-side end 12 opposite to the object-side end 11. The lens barrel 10 defines a substantially tubular receiving room 13 extending through the object-side end 11 and the image-side end 12. In the embodiment, the lens barrel 10 is made of light-shielding/opaque/black material(s).

The at least one lens 20 is received in the receiving room 13, adjacent to the object-side end 11. Each of the at least one lens 20 can be made of plastic, glass, or other transparent materials, and can be spherical or aspherical. In the embodiment, the lens module 100 includes two lenses 20 arranged in the receiving room 13.

The infrared absorbing filter 30 is received in the receiving room 13, between the at least one lens 20 and the image side end 12. The infrared absorbing filter 30 is configured for absorbing infrared light rays penetrating through the at least one lens 20. The infrared absorbing filter 30 includes a glass plate 31, and the glass plate 31 includes an object-side surface 311 and an image-side surface 312.

The glass plate 31 is molded by melting a composition of raw materials and cooling the melted composition. The composition of raw materials includes 28-33 by percentage weight (wt %) of phosphorus pentoxide ($P_2O_5$), 14-33 wt % of A oxide ($A_2O$), 0.15-4 wt % of B oxide (BO), 2.5-8 wt % of copper oxide (CuO), 1.4-1.65 wt % of aluminum oxide ($Al_2O_3$), 1-2 wt % of zinc oxide (ZnO), and 15-22.5 wt % of fluoride. Wherein A is one of alkali metals, $A_2O$ is one of oxidizing alkali metals, B is one of alkaline earth metals, BO is one of oxidizing alkaline earth metals.

In the embodiment, $P^{5+}$ is one of the essential components of fluorophosphate glasses. If the percentage weight of $P_2O_5$ of the composition of raw materials is lower than 28%, the transmission of glass plate 31 will be decreased and the color of the glass plate 31 is green. If the percentage weight of $P_2O_5$ of the composition of raw materials is greater than 33%, the weather resistance and the surface fog degree of the glass plate 31 will be deteriorated when the weather is varied.

The $A_2O$ is chosen from the group consisting of lithium oxide ($Li_2O$), sodium oxide ($Na_2O$), and potassium oxide ($K_2O$). Wherein the percentage weight of $Li_2O$ is 30-33%, the percentage weight of $Na_2O$ is 14-16%, and percentage weight of $K_2O$ is 22-24%. $A^+$ is one of the essential components of the glass plate 31 to improve the melt performance, the surface fog degree, and the transmission. If the percentage weight of $A_2O$ of the composition of raw materials is lower than 14%, the improving effect of above will not present. If the percentage weight of $A_2O$ of the composition of raw materials is greater than 33%, the surface fog degree and the processing feasibility of the glass plate 31 will be deteriorated.

The BO is chosen from the group consisting of magnesium oxide (MgO), calcium oxide (CaO), strontium oxide (SrO), and barium oxide (BaO). Wherein the percentage weight of MgO is 0.15-0.95%, the percentage weight of CaO is 0.15-4%, the percentage weight of SrO is 0.15-0.95%, and the percentage weight of BaO is 0.15-0.95%. $B^{2+}$ is one of the essential components of the glass plate 31 to improve the weather resistance, the surface fog degree, and the processing feasibility. If the percentage weight of BO of the composition of raw materials is lower than 0.15%, the improving effect of above will not present. If the percentage weight of BO of the composition of raw materials is greater than 4%, the surface fog degree of the glass plate 31 will be deteriorated.

$Al^{3+}$ is one of the essential components of the glass plate 31 to improve the surface fog degree, the heat resistance, the thermal shock, the mechanical strength, and the chemical durability. If the percentage weight of $Al_2O_3$ of the composition of raw materials is lower than 1.4%, the above mentioned improving effect will not be present. If the percentage weight of $Al_2O_3$ of the composition of raw materials is greater than 1.65%, the absorbing ability to the infrared light will be decreased.

$Cu^{2+}$ is one of the essential components of the glass plate 31 to absorb the infrared light. If the percentage weight of CuO of the composition of raw materials is lower than 2.5%, the absorbing ability to the infrared light will be decreased. If the percentage weight of CuO of the composition of raw materials is greater than 8%, there will be a number of flaws, such as impurities and stretch mark, formed on a surface of the glass plate 31.

$Zn^{2+}$ is used to correct the absorbing ability to the infrared light, and to improve the melt performance and the surface fog degree of the glass plate 31. If the percentage weight of ZnO of the composition of raw materials is lower than 1%, the improving effect will not be present. If the percentage weight of ZnO of the composition of raw materials is greater than 2%, the surface fog degree of the glass plate 31 will be deteriorated.

$F^-$ is one of the essential anions of the glass plate 31 to decrease the melting point and improve the melt performance, the surface fog degree, and the weather resistance. If the percentage weight of fluoride of the composition of raw materials is lower than 15%, the weather resistance of the glass plate 31 will be deteriorated. If the percentage weight of fluoride of the composition of raw materials is greater than 22.5%, the percentage weight of $O^{2-}$ will be decreased, and color of the glass plate 31 will be changed as the $Cu^{2+}$ is deoxidized to $Cu^+$.

An anti-reflection film 32 is coated on the object-side surface 311 of the glass plate 31. An infrared filtering film 33 is coated on the image-side surface 312 of the glass plate 31. The anti-reflection film 32 provides an enhanced transmissivity for light, and thus less than about 3% of all light entering will be reflected by the anti-reflection film 32. As the infrared filtering film 33 can further filter out the infrared light, less infrared lights will penetrate through the glass plate 31.

The image sensor 40 is positioned at the image-side end 12 and covers the receiving room 13. The light passing the at least one lens 20 will be directly projected on an imaging surface of the image sensor 40 which converts the light to electrical signals.

Figure 2:
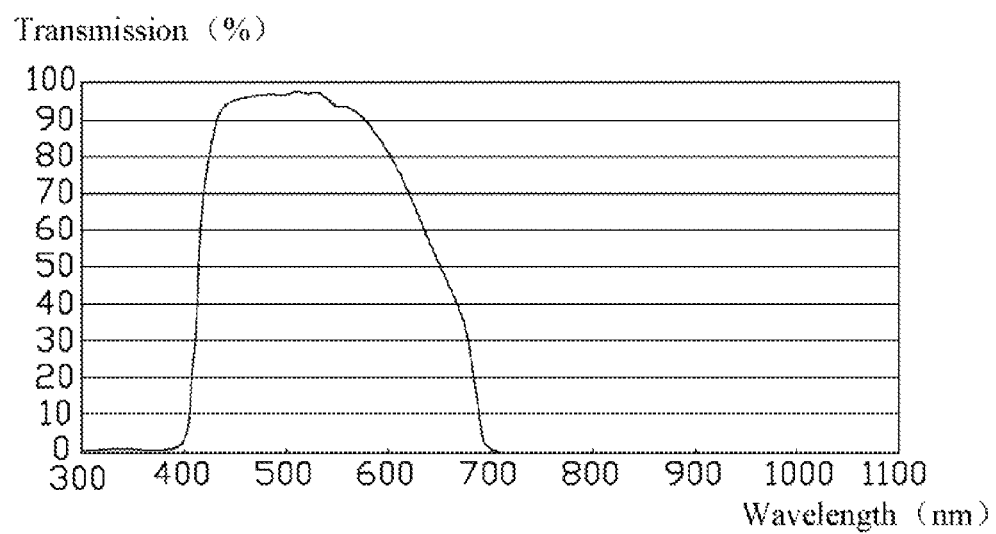
FIG. 2 is a spectrum chart of the infrared absorbing filter of the lens module of FIG. 1.

Further referring to FIG. 2, light enter into the lens module 100 from the object-side end 11 of the lens barrel 10 and strike the infrared absorbing filter 30. The light rays penetrate the anti-reflection film 32, then the glass plate 31, and then the infrared filtering film 33. The infrared constituent of the light rays penetrating the anti-reflection film 32 are absorbed by the glass plate 31. The transmission of the light rays with wavelength from about 400 nm to about 500 nm will be above 80-90%. The middle wavelength (T50%) can be designed at any value from about 600 nm to about 650 nm. The transmission of the light rays with wavelength from about 750 nm to about 1100 nm will be lower than 3%.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An infrared absorbing filter, comprising:
a glass plate made from a composition of raw materials;
the composition of raw materials comprising: 28-33 by percentage weight (wt %) of phosphorus pentoxide ($P_2O_5$), 14-33 wt % of A oxide ($A_2O$), 0.15-4 wt % of B oxide (BO), 2.5-8 wt % of copper oxide (CuO), 1.4-1.65 wt % of aluminum oxide ($Al_2O_3$);
wherein A is one of alkali metals, $A_2O$ is one of oxidizing alkali metals, B is one of alkaline earth metals, and BO is one of oxidizing alkaline earth metals.

2. The infrared absorbing filter of claim 1, wherein the composition of raw materials further comprises 1-2 wt % of zinc oxide (ZnO).

3. The infrared absorbing filter of claim 1, wherein $A_2O$ is lithium oxide ($Li_2O$), and the percentage weight of $Li_2O$ is 30-33%.

4. The infrared absorbing filter of claim 1, wherein $A_2O$ is sodium oxide ($Na_2O$), and the percentage weight of $Na_2O$ is 14-16%.

5. The infrared absorbing filter of claim 1, wherein $A_2O$ is potassium oxide ($K_2O$), and the percentage weight of $K_2O$ is 22-24%.

6. The infrared absorbing filter of claim 1, wherein BO is magnesium oxide (MgO), and the percentage weight of MgO is 0.15-0.95%.

7. The infrared absorbing filter of claim 1, wherein BO is calcium oxide (CaO), and the percentage weight of CaO is 0.15-4%.

8. The infrared absorbing filter of claim 1, wherein BO is strontium oxide (SrO), and the percentage weight of SrO is 0.15-0.95%.

9. The infrared absorbing filter of claim 1, wherein BO is barium oxide (BaO), and the percentage weight of BaO is 0.15-0.95%.

10. The infrared absorbing filter of claim 1, wherein the composition of raw materials further comprises 15-22.5 wt % of fluoride.

11. A lens module, comprising:
at least one lens;
a lens barrel receiving the at least one lens; and
a infrared absorbing filter received in the lens barrel, comprising:
a glass plate made from a composition of raw materials;
the composition of raw materials comprising: 28-33 by percentage weight (wt %) of $P_2O_5$, 14-33 wt % of $A_2O$, 0.15-4 wt % of BO, 2.5-8 wt % of CuO, 1.4-1.65 wt % of $Al_2O_3$;
wherein A is one of alkali metals, $A_2O$ is one of oxidizing alkali metals, B is one of alkaline earth metals, and BO is one of oxidizing alkaline earth metals.

* * * * *